Figure 1:
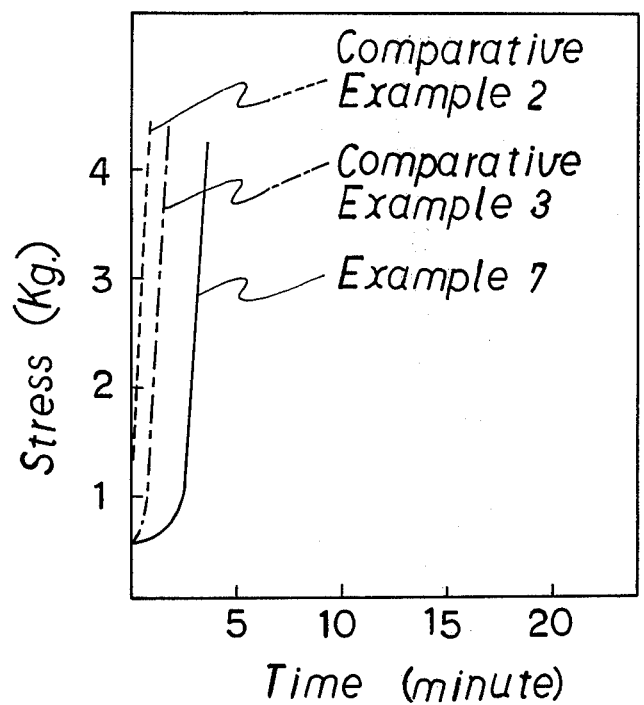

United States Patent [19]
Kometani et al.

[11] 3,931,124
[45] Jan. 6, 1976

[54] FLUOROELASTOMER COMPOSITION

[75] Inventors: Yutaka Kometani; Shun Koizumi, both of Toyonaka; Takeshi Suzuki, Kyoto; Yasuyoshi Furukawa, Neyagawa; Masayasu Tomoda, Takatsuki; Kiyoichi Kondo, Settsu, all of Japan

[73] Assignee: Daikin Kogyo Co., Ltd., Osaka, Japan

[22] Filed: Mar. 25, 1974

[21] Appl. No.: 454,165

Related U.S. Application Data

[62] Division of Ser. No. 303,769, Nov. 6, 1972, Pat. No. 3,857,807.

[30] Foreign Application Priority Data

Nov. 11, 1971  Japan.................................. 46-90488
July 25, 1972  Japan.................................. 47-74849

[52] U.S. Cl. ........ 260/80.77; 260/87.5 A; 260/87.7
[51] Int. Cl.² ................. C08f 214/8; C08f 214/20; C08f 214/22; C08F 214/24
[58] Field of Search............ 260/87.5 A, 87.7, 80.77

[56] References Cited
UNITED STATES PATENTS
3,347,812  11/1967  De Marco et al. ............ 260/29.6 F

*Primary Examiner*—Joseph L. Schofer
*Assistant Examiner*—Maria S. Tungol
*Attorney, Agent, or Firm*—Stevens, Davis, Miller & Mosher

[57] ABSTRACT

A fluoroelastomer composition which contains (a) a fluoroelastomer, (b) at least one member selected from the group consisting of bivalent metal oxide, bivalent metal hydroxide and mixture of bivalent metal oxide or metal hydroxide with metal salt of weak acid, (c) an aromatic polyhydroxy compound, and (d) a quaternary ammonium compound of 8-alkyl- or 8-aralkyl-1,8-diaza-bicyclo[5.4.0]-7-undecenium, provides a fluoro-rubber having a low compression set and an excellent elastic property. The fluoroelastomer composition can be handled and processed with safety, and yet can be cured with a good cure rate, and has excellent storage properties. The cure rate of the composition is further accelerated by addition of (e) water or a metal compound which produces water by reacting it with hydrogen fluoride.

17 Claims, 2 Drawing Figures

FLUOROELASTOMER COMPOSITION

This is a division, of application Ser. No. 303,769, filed 11/6/72 now U.S. Pat. No. 3,857,807 filed 12/31/74.

BACKGROUND OF THE INVENTION

The present invention relates to a novel fluoroelastomer composition, and more particularly to a fluoroelastomer composition suitable for preparing a fluoro-rubber having a low compression set and an excellent elastic property.

The term "fluoroelastomer" used herein means a highly fluorinated elastic copolymer and the term "fluoro-rubber" used herein means a cured copolymer obtained by curing the fluoroelastomer.

A fluoro-rubber has an excellent heat resistance, a low temperature resistance and a chemical resistance and is useful for gaskets, sealants, diaphragmes, pipes and so on.

It is well known that fluoro-rubber is prepared by curing a fluoroelastomer in the presence of curing agent. The fluoro-rubber is required to have an excellent elastic property as well as a low compression set in the practical uses. In general, however, a fluoro-rubber prepared by curing a conventional composition tends to be inferior in compression set when the elastic property is guaranteed and, on the other hand, tends to reduce its elastic property when compression set is suppressed. Therefore, a fluoroelastomer composition which can be cured to provide a fluoro-rubber having an excellent elastic property in addition to a low compression set is earnestly desired.

Recently, various fluroelastomer compositions which can be cured to provide fluoro-rubbers having a low compression set have been proposed. These fluoroelastomer compositions are somewhat effective for reducing compression set, but it tends to have poor elastic property.

OBJECT OF THE INVENTION

It is an object of the present invention to provide a novel fluoroelastomer composition which can be cured to provide a fluoro-rubber having a low compression set and an excellent elastic property.

A further object of the invention is to provide a fluoroelastomer composition capable of being cured for a short time with safety.

A still further object of the invention is to provide a fluoroelastomer composition having excellent storage properties.

These and other objects will become apparent from the description hereinafter.

DESCRIPTION OF THE INVENTION

It has now been found that the above-mentioned objects can be attained by the fluoroelastomer composition which comprises (a) a fluoroelastomer, (b) at least one member selected from the group consisting of bivalent metal oxide, bivalent metal hydroxide and mixture of bivalent metal oxide or metal hydroxide with a metal salt of weak acid, (c) an aromatic polyhydroxy compound, and (d) a quaternary ammonium compound having the general formula:

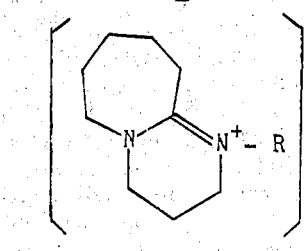

wherein R is an alkyl group having 1 to 24 carbon atoms or an aralkyl group having 7 to 20 carbon atoms, and $X^-$ is an anion such as halide ion, hydroxylate ion, alkoxylate ion, carboxylate ion, phenoxide ion, sulfonate ion, sulfate ion, sulfite ion and carbonate ion. Further, by the addition of (c) water or a metal compound which readily produces water by reacting it with hydrogen fluoride, the cure rate of the composition can be accelerated without reducing the elastic property.

According to the present invention, there can be obtained a fluoro-rubber having excellent elastic properties as modulus at 100 % elongation, tensile strength, elongation and hardness, and low compression set at room or high temperature. For instance, when the fluoro-rubber of the invention instead of a conventional fluoro-rubber is used as a packing material in oil pressure machines under severe condition, repeated tightening of the packing material is not required to prevent leaks of oil or gas, owing to the excellent properties of the fluoro-rubber of the present invention, particularly low compression set and excellent elastic property.

Further, the fluoroelastomer composition of the invention can be handled and processed with safety. For instance, scorching seldom occurs during handling before cure. A complicated article can be readily prepared without any showing of back rind and other inferiorities because of the favorable flowability at the press cure. And yet, the composition of the invention can be cured at a good cure rate. Moreover, the composition of the invention has the advantage it has excellent storage properties in comparison with conventional fluoroelastomer compositions.

In the present invention, it is essential that the above (d) ingredient is quaternary ammonium compound of 8-alkyl- or 8-aralkyl-1,8-diaza-bicyclo[5.4.0]-7-undecenium. Because, when 1,8-diaza-bicyclo[5.4.0]-7-undecene per se or their salts of mineral acid or organic acid are employed, such excellent effects in handling or processing as obtained by the present invention can not be obtained. It is very difficult to handle 1,8-diaza-bicyclo[5.4.0]-7-undecene per se because of its strong basicity. On the other hand, the use of quaternary ammonium compound consisting of 8-alkyl - or 8-aralkyl-1,8-diaza-bicyclo[5.4.0]-7-undecenium cations and anions such as halide ion and sulfate ion can eliminate the above difficulty.

The fluoroelastomer (a) ingredient of the invention, which is a highly fluorinated elastic copolymer, is, for instance, copolymers of vinylidene fluoride and at least one other fluoroolefin such as hexafluoropropene, pentafluoropropene, trifluoroethylene, trifluorochloroethylene, tetrafluoroethylene, vinyl fluoride, perfluoro(methyl vinyl ether), perfluoro(propyl vinyl ether), or the like.

Vinylidene fluoride-hexafluoropropene copolymer and vinylidene fluoride-tetrafluoroethylene-hexafluoropropene terpolymer are preferably employed. In particular, it is interesting to use a copolymer which composition is in the ratio of vinylidene fluoride and hexafluoropropene being 92 : 8 to 66 : 34 by mole, or a terpolymer which composition is in rectangular area formed by the following four ratios of vinylidene fluoride, tetrafluoroethylene and hexafluoropropene being 85.7 : 5 : 9.3, 59.7 : 5 : 35.3, 28 : 30 : 42 and 54 : 30 : 16 by mole, obtained by means of the process of suspension polymerization at low temperature.

Further, there may be effectively employed such polymers as obtained by copolymerizing a small amount of monomer such as vinyl compound, olefin, diene or α,β-ethylenically unsaturated carboxylic acid in addition to the above-mentioned monomers.

Figure 2:
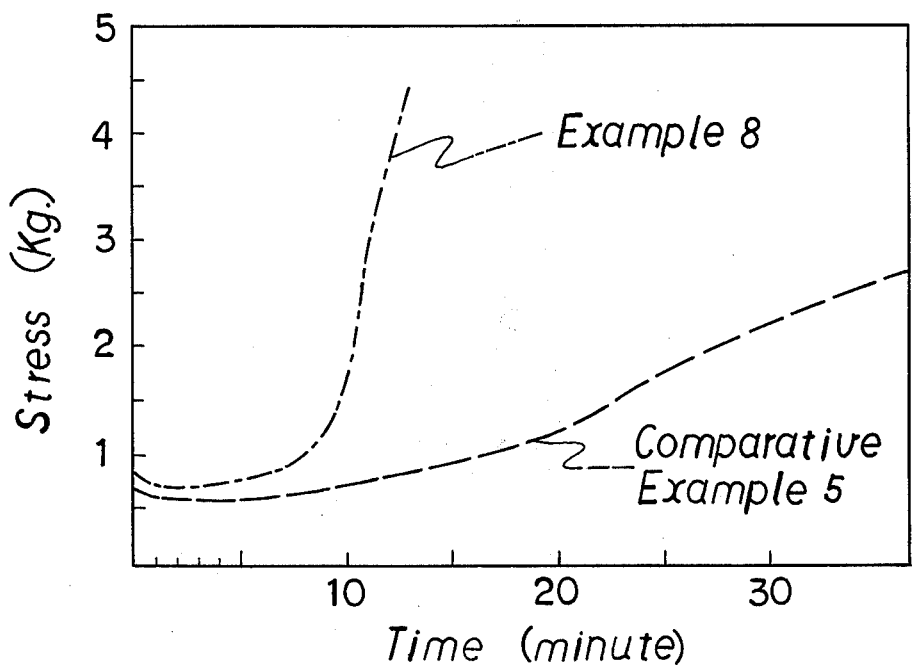

FIG. 1 and FIG. 2 are graphs respectively showing a curing curve of a fluoroelastomer composition in the present invention and those or that of comparative fluoroelastomer compositions.

Suitable examples of (b) ingredient of the invention are bivalent metal oxides such as MgO, CaO, PbO or ZnO, metal hydroxides such as $Mg(OH)_2$, $Ca(OH)_2$, $Pb(OH)_2$ or $Zn(OH)_2$, and mixtures of the above metal oxides and/or metal hydroxides with metal salts which are formed from metals such as Ba, Na, K, Pb and Ca and weak acids such as stearic acid, benzoic acid, carbonic acid, oxalic acid and phosphorous acid.

Examples of (c) ingredient being aromatic polyhydroxy compounds are 2,2-bis(4-hydroxyphenyl)propane (Bisphenol A), 2,2-bis(4-hydroxyphenyl)perfluoropropane (Bisphenol AF), resorcinol, 1,3,5-trihydroxybenzene, 1,7-dihydroxynaphthalene, 2,7-dihydroxynaphthalene, 1,6-dihydroxynaphthalene, 4,4'-dihyroxydiphenyl, 4,4'-dihydroxystilbene, 2,6-dihydroxyanthracene, hydroquinone, catechol, 2,2-bis(4-hydroxyphenyl)butane (Bisphenol B), 4,4-bis(4-hydroxyphenyl)pentanoic acid, 2,2-bis(4-hydroxyphenyl) tetrafluorodichloropropane, 4,4'-dihydroxydiphenyl sulfone, 4,4'-dihydroxydiphenyl ketone, tri(4-hydroxyphenyl)methane, 3,3',5,5'-tetrachloro-bisphenol A, 3,3'5,5'-tetrabromo-bisphenol A, and the like. Hydroquinone, Bisphenol A, Bisphenol B and Bisphenol AF are especially preferred, and alkali metal salts or alkaline earth metal salts of the above-mentioned aromatic polyhydroxy compounds may be also employed.

Examples of (d) ingredient being quaternary ammonium compound are as follows: 8-methyl-1,8-diaza-bicyclo[5.4.0]-7-undecenium chloride, 8-diaza-bicyclo[5.4.0]-7-undecenium iodide, 8-methyl-1,8-diaza-bicyclo[5.4.0]-7-undecenium hydroxide, 8-methyl-1,8-diaza-bicyclo[5.4.0]-7-undecenium methylsulfate, 8-ethyl-1,8-diaza-bicyclo-[5.4.0]-7-undecenium bromide, 8-propyl-1,8-diaza-bicyclo-[5.4.0]-7-undecenium bromide, 8-dodecyl-1,8-diaza-bicyclo-[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0]-7-undecenium chloride, 8-benzyl-1,8-diaza-bicylclo[5.4.0]-7-undecenium chloride, 8-benzy-1,8-diaza-bicyclo[5.4.0]-7-undecenium hydroxide, 8-phenethyl-1,8-diaza-bicyclo[5.4.0]-7-undecenium chloride, 8-(3-phenyl-propyl)-1,8-diaza-bicyclo[5.4.0]-7-undecenium chloride, and the like.

The water (e) ingredient can be added directly or in the form of metal salt hydrates into the fluoroelastomer composition, which metal salt hydrates are capable of providing water harmlessly in cure, such as $KgSO_4.7H_2O$, $CuSO_4.5H_2O$ and $FeSO_4.7H_2O$. As a metal compound which readily produces water by reacting it with hydrogen fluoride, metal hydroxides such as $Mg(OH)_2$, $Pb(OH)_2$ and $Ca(OH)_2$ may be employed. In case of using these metal hydroxides, the addition of (b) ingredient may be omitted.

As the amount of the above ingredients to 100 parts by weight of fluoroelastomer in the present invention, 2 to 30 parts, preferably 5 to 20 parts by weight of (b) ingredient, 0.5 to 5 parts, preferably 1 to 2parts by weight of (c) ingredient and 0.2 to 10 parts, preferably 0.5 to 3 parts by weight of (d) ingredient respectively are suitably employed. In case the amount of (d) ingredient is less than the above range, the cure of the fluoroelastomer composition tends to occur unsatisfactory. On the other hand, in case that of (d) ingredient is more than the above range, the elastic properties of the resultant fluororubber are liable to be reduced. The amount of water being (e) ingredient may be 0.1 to 10 parts, preferably 0.5 to 5 parts by weight to 100 parts by weight of fluoroelastomer. The amount of the metal compound varies according to the kind thereof, and in general it may be 0.5 to 30 parts, preferably 2 to 10 parts by weight to 100 parts by weight of fluoroelastomer.

In the present invention, filler such as carbon black, silica, clay, diatomaceous earth or talc may be further added into the composition of the invention in accordance with necessity. If necessary, one or more of a small amount of the conventional curing agent may be added into the composition of the invention unless the spirit of the present invention is lost. Moreover, plasticizer and colorant also may be added.

Thus obtained fluoroelastomer composition can be cured by conventional process. For instance the composition is milled by mixing rolls and the resultant compound is put into a mold and cured under pressure and then the resultant article is removed out of the mold, followed by curing it in an oven. In general, the press cure is carried out at a temperature of 100° to 200°C. under a pressure of 20 to 100 kg./cm.$^2$ for a period of 10 to 180 minutes, and the oven cure is carried out at a temperature of 150° to 300°C. for a period of 0 to 30 hours. Other processes for cure, for instance, a process which the cure is carried out after pre-molding such as injection molding or extrusion molding; alternatively a process which a coating composition prepared by dissolving or dispersing the fluoroelastomer composition into a solvent such as ketons, e.g. methyl ethyl ketone, acetone and cyclohexanone, ethers, e.g. methylethyl ether, diethyl ether, dioxane and tetrahydrofuran, or a mixture thereof is applied on a surface of paper, fiber, film, sheet, board, tube, pipe, tank, big vessel or the other shaped articles (made by cellulose derivatives, synthetic resin, metal or the others) and then cured, may be carried out.

The fluoro-rubber obtained by the fluoroelastomer composition of the present invention has advantages such as an excellent heat resistance, a low temperature resistance and a chemical resistance as well as the fluoro-rubber obtained by a conventional fluoroelastomer composition, and further shows excellent properties above-mentioned, which can not be obtained by a conventional fluoroelastomer composition.

The present invention is more specifically described and explained by means of the following Examples which, however, are not intended to be limited. In Examples, all parts and percentages are by weight except as otherwise noted.

REFERENCE EXAMPLE 1

A three liter stainless steel autoclave was charged with 1,000 parts of demineralized and deoxidized water. Air within the autoclave was thoroughly replaced with pure nitrogen gas and then nitrogen gas within the autoclave was thoroughly replaced with tetrafluoroethylene. The autoclave was charged with 96 parts of a monomer mixture consisting of 27.1 % of vinylidene fluoride, 63.5 % of hexafluoropropene and 9.4 % of tetrafluoroethylene. The temperature was raised to 100°C. with agitation and the polymerization was initiated by adding 10 parts of a 6 % aqueous solution of ammonium persulfate under a pressure of 12 kg./cm$^2$.

The polymer was obtained in a form of emulsion. A 10 % aqueous solution of magnesium chloride was added to the autoclave to coagulate the polymer. The polymer was washed with water and dried to give 423 parts of colorless elastic terpolymer.

REFERENCE EXAMPLE 2

A three liter stainless steel autoclave provided with a magnetic stirrer was charged with one liter of deoxidized water and 0.3 g. of methylcellulose (50 cps.). After air within the autoclave was thoroughly replaced with pure nitrogen gas and then evacuated, the autoclave was charged with 300 cc. of 1,1,2-trichloro-1,2,2-trifluoroethane, then with 300 g. of a monomer mixture consisting of hexafluoropropene, vinylidene fluoride and tetrafluoroethylene in the molar ratio of 50.6 : 44.9 : 4.5 and kept at 30°C. with agitation.

A 125 cc. tank cooled by dry ice was charged with 50 cc. of 1.97 % solution of di(3,5,6-trichloro2,2,3,4,4,5,6,6-octafluorohexanoyl) peroxide in 1,1,2-trichloro-1,2,2-trifluoroethane, and the solution was introduced into the autoclave by nitrogen pressure to initiate polymerization.

Another 20 liter autoclave autoclave was charged with a monomer mixture for continuous charging consisting of hexafluoropropene, vinylidene fluoride and tetrafluoroethylene in the molar ratio of 20 : 68 : 12 and connected to the said autoclave. The monomer mixture was supplied to the autoclave so as to maintain a constant pressure between 9 to 10 kg./cm.$^2$G. Further, 50 cc. of the said initiator solution was additionally supplied, and polymerization for about 5 hours gave about 300 g. of a fluoroelastomer as small white granules.

REFERENCE EXAMPLE 3

A three liter stainless steel autoclave provided with a magnetic stirrer was charged with one liter of deoxidized water and 0.3 g. of methylcellulose (50 cps.). After air within the autoclave was thoroughly replaced with pure nitrogen gas and then evacuated, the autoclave was charged with 300 cc. of 1,1,2-trichloro1,2,2-trifluoroethane, and then with 300 g. of a monomer mixture consisting of hexafluoropropene and vinylidene fluoride in the molar ratio of 58 : 42. It was maintained at 30°C. with agitation.

A 125 cc. tank cooled by dry ice was charged with 50 cc. of 1.97 % solution of di(3,5,6-trichloro-2,2,3,4,4,5,6,6-octafluorohexanoyl) peroxide in 1,1,2-trichloro-1,2,2-trifluoroethane, and the solution was introduced into the autoclave by nitrogen pressure to initiate polymerization.

Another 20 liter stainless steel autoclave was charged with a monomer mixture for continuous charging consisting of hexafluoropropene and vinylidene fluoride in the molar ratio of 25 : 75 and connected to the said autoclave. The monomer mixture was supplied to the autoclave so as to maintain the polymerization pressure between 8 and 9 kg./cm.$^2$G. The polymerization was carried out for about 5 hours. Then, the residual monomers were purged off to give about 140 g. of a small granular fluoroelastomer.

EXAMPLES 1 to 6

The vinylidene fluoride-hexafluoropropene-tetrafluoroethylene terpolymer copolymerized in the molar ratio of 66.5 : 16.0 : 17.5, which was previously obtained by Reference Example 1, was milled by a mixing roll at a room temperature, while adding medium thermal carbon, magnesium oxide, calcium hydroxide, hydroquinone and 8-methyl-1,8-diaza-bicyclo[5.4.0]-7-undecenium iodide with the amount showed in the following Table 1, in order, and the resultant compounds were allowed to stand over night. After milling again, the composition was put into a mold and cured at a temperature of 170°C. under a pressure of 55 kg./cm.$^2$G. for a period of 30 minutes to give sheet and block, respectively. The resultant was removed out of the mold and cured at a temperature of 230°C. for a period of 24 hours (Example 1).

Modulus at 100 % elongation, tensile strength, elongation and hardness of the obtained fluoro-rubber sheet and compression set of the obtained fluoro-rubber block were measured. And further curing test of the composition was carried out and stresses after lapse of a fixed time was measured by using a Curelasto Meter.

Moreover the procedure of Example 1 was repeated except that 8-benzyl-1,8-diaza-bicyclo[5.4.0]-7-undecenium chloride, 8-ethyl-1,8-diaza-bicyclo[5.4.0]-7-undecenium bromide, 8-n-dodecyl-1,8diaza-bicyclo[5.4.0]-7-undecenium chloride, 8-benzyl-1,8-diaza-bicyclo[5.4.0]-7-undecenium hydroxide, respectively, were employed instend of 8-methyl-1,8-diaza-bicyclo[5.4.0]-7-undecenium iodide (Example 2,3,4,5), that water was further added (Example 6), and that N,N'-dicinnamylidene-1,6-hexanediamine was employed as a conventional curing agent instead of 8-methyl-1,8-diaza-bicyclo[5.4.0]-7-undecenium iodide and hydroquinone (Comparative Example 1). The amount employed and the result were shown in the following Table 1.

Table 1

| | Ingredients | | | | | | | | | | |
|---|---|---|---|---|---|---|---|---|---|---|---|
| | Fluoroelastomer | Magnesium oxide | Medium thermal carbon | Calcium hydroxide | Hydroquinone | a | b | c | d | e | f | water |
| Ex. 1 | 100 | 10 | 20 | 4 | 1 | 2 | — | — | — | — | — | — |
| Ex. 2 | 100 | 10 | 20 | 2 | 1 | — | 1 | — | — | — | — | — |
| Ex. 3 | 100 | 10 | 20 | 4 | 1.2 | — | — | 1 | — | — | — | — |
| Ex. 4 | 100 | 10 | 20 | 4 | 1.2 | — | — | — | 0.6 | — | — | — |
| Ex. 5 | 100 | 10 | 20 | 6 | 1 | — | — | — | — | 1 | — | — |
| Ex. 6 | 100 | 10 | 20 | — | 1 | — | 1 | — | — | — | — | 1 |

Table 1-continued

| | Ingredients | | | | | | | | | | | |
|---|---|---|---|---|---|---|---|---|---|---|---|---|
| | Fluoroelastomer | Magnesium oxide | Medium thermal carbon | Calcium hydroxide | Hydroquinone | a | b | c | d | e | f | water |
| Com. Ex. 1 | 100 | 10 | 20 | — | — | — | — | — | — | — | 3 | — |

| Curing test | | | | | | | | Properties | | | | Compression set | |
|---|---|---|---|---|---|---|---|---|---|---|---|---|---|
| 1 min. | 2 min. | 3 min. | 4 min. | 5 min. | 10 min. | 20 min. | 30 min. | Modulus at 100 % (kg./cm.$^2$) | Tensile strength (kg./cm.$^2$) | Elongation (%) | Hardness | 30°C × 24hr (%) | 200°C × 24hr (%) |
| | | | | (kg.) | | | | | | | | | |
| 0.55 | 0.60 | 0.65 | 0.70 | 0.80 | 2.25 | 3.20 | 3.30 | 71 | 154 | 180 | 77 | 11 | 19 |
| 0.75 | 0.70 | 0.70 | 0.70 | 0.75 | 1.75 | 2.90 | 4.00 | 85 | 156 | 170 | 80 | 10 | 21 |
| | | | | | | (11 min.) | (12 min.) | | | | | | |
| 0.60 | 0.62 | 0.75 | 1.02 | 1.68 | 5.00 | → | increase | 104 | 161 | 170 | 78 | 9 | 16 |
| 0.60 | 0.58 | 0.60 | 0.65 | 0.75 | 2.80 | 4.60 → | increase | 88 | 172 | 170 | 77 | 10 | 18 |
| 0.45 | 0.48 | 0.51 | 0.58 | 0.61 | 1.20 | 2.98 | 3.20 | 83 | 142 | 180 | 80 | 12 | 20 |
| 0.50 | 1.70 | 2.40 | 3.30 | 4.60 | — | — | — | 75 | 164 | 170 | 79 | 12 | 23 |
| 0.55 | 0.65 | 1.05 | 1.45 | 1.80 | 2.70 | 3.10 | 3.20 | 50 | 180 | 290 | 76 | 33 | 35 |

(Note)
a: 8-methyl-1,8-diaza-bicyclo[5.4.0]-7-undecenium iodide
b: 8-benzyl-1,8-diaza-bicyclo[5.4.0]-7-undecenium chloride
c: 8-ethyl-1,8-diaza-bicyclo[5.4.0]-7-undecenium bromide
d: 8-n-dodecyl-1,8-diaza-bicyclo[5.4.0]-7-undecenium chloride
e: 8-benzyl-1,8-diaza-bicyclo[5.4.0]-7-undecenium hydroxide
f: N,N-dicinnamylidene-1,6-hexanediamine

NOTE

1. Modulus at 100 % elongation, tensile strength and elongation are measured with dumbbell test pieces (No. 3) prepared from the samples of cured sheet by using a universal tensile tester (UTM-III type) made by Toyo Sokki Kabushiki Kaisha according to the provision of Japanese Industrial Standard K 6301 corresponds to ASTM D 412-68.

2. Hardness is measured by using a hardness tester (Asker J type) made by Kobunshi Keiki Kabushiki Kaisha.

3. Compression set is measured with the test disk samples prepared from the samples of cured block, according to the provision to the provision of JIS K 6301, as follows: The test samples are kept at 30°C. and 200°C. under a compression of 25 % for 24 hours, and then allowed to stand at a room temperature for 30 minutes for measurement with a thickness gauge for rubber of Peacock type made by Kabushiki Kaisha Ozaki Seisakusho. Compression set is calculated on the basis of a thickness of sample according to the following equation:

$$\text{Compression set (\%)} = \frac{t_0 - t_1}{t_0 - t_2} \times 100$$

wherein $t_0$ is thickness (mm.) before compression, $t_1$ is thickness (mm.) after compression and $t_2$ is thickness (mm.) of spacer.

4. Curing test is carried out with the sample (34 mm. × 7 mm. × 2 mm.) by using a Curelasto Meter (JSR-Curelasto Meter No. II Type). The test sample is put into a mold chamber and tested under the condition of temperature of 180°C., frequency of 6 c./min. and amplitude of 3°, and then stress is measured after the lapse of the fixed time.

EXAMPLE 7

The process for curing of Example 1 was repeated for the composition shown in the following Table 2, and the curing test was carried out, which results are shown in Table 2. FIG. 1 shows the curing curves of Example 7, Comparative Examples 2 and 3 recorded by Curelasto Meter.

As is clear from Table 2 and FIG. 1, the composition including 8-benzyl-1,8-diaza-bicyclo[5.4.0]-7-undecenium chloride of the present invention has an adequate induction period and an excellent processing, and can be cured with good cure rate in comparison with the compostions including 1,8-diaza-bicyclo[5.4.0]-7-undecene per se and its salts (hydrogenchloride and phenol) as Comparative Examples.

EXAMPLE 8

The process for curing of Example 1 was repeated for the composition shown in the following Table 3 and the curing test was carried out in the same manner as in Example 1 except that the temperature was 150°C. The results were shown in Table 3. FIG. 2 shows the curing curves of Example 8 and Comparative Example 5 recorded by Curelasto Meter.

As is clear from Table 3 and FIG. 2, the cure rate of the composition including 8-benzyl-1,8diaza-bicyclo[5.4.0]-7-undecenium chloride of the present invention is higher than that of the composition including tetradecyldimethylbenzylammonium chloride as Comparative Example.

EXAMPLES 9 to 11

Using the fluoroelastomers obtained by Reference Example 1 for Example 9, by Reference Example 2 for Example 10 and by Reference Example 3 for Example 11, the process for curing of Example 1 was repeated for the composition shown in the following Table 4 and the properties of the resultant rubber were measured. The results were shown in Table 4.

Table 2

| | Fluoro-elastomer | Magnesium oxide | Medium thermal carbon | Calcium hydroxide | Hydroquinone | 1,8-diaza-bicyclo[5.4.0]-7-undecene | 1,8-diaza-bi cyclo[5.4.0]-7-undecene hydrochloride | 1,8-diaza-bicyclo[5.4.0]-7-undecene phenol | 8-benzyl-1,8-diaza-bicyclo-[5.4.0]-7-undecenium chloride |
|---|---|---|---|---|---|---|---|---|---|
| Ex. 7 | 100 | 10 | 20 | 2 | 1 | — | — | — | — |
| Com. Ex. 2 | 100 | 10 | 20 | 2 | 1 | 1 | — | — | — |
| Com. Ex. 3 | 100 | 10 | 20 | 2 | 1 | — | 1 | — | — |
| Com. Ex. 4 | 100 | 10 | 20 | 2 | 1 | — | — | 1 | — |

Curing test

| 1 min. | 1.2 min. | 2 min. | 3 min. | 3.5 min. | 4 min. |
|---|---|---|---|---|---|
| | | (kg.) | | | |
| 0.55 | — | 0.70 | 1.60 | 4.00 ⟶ | increase |
| 1.50 | 4.0 ⟶ | Scorch increase Scorch | | | |

Table 3

| | Fluoroelastomer | Magnesium oxide | Medium thermal carbon | Calcium hydroxide | Hydroquinone | 8-benzyl-1,8-aza-bicyclo-[5.4.0]-7-undecenium chloride | tetradecyldimethyl-benzylammonium chloride |
|---|---|---|---|---|---|---|---|
| Ex. 8 | 100 | 10 | 20 | 2 | 1 | 1 | — |
| Com. Ex. 5 | 100 | 10 | 20 | 2 | 1 | — | 1 |

Curing test

| 1 min. | 2 min. | 3 min. | 4 min. | 5 min. | 10 min. | 11 min. | 12 min. | 20 min. | 30 min. |
|---|---|---|---|---|---|---|---|---|---|
| | | | | | (kg.) | | | | |
| 0.75 | 0.70 | 0.70 | 0.70 | 0.75 | 1.75 | 2.90 | 4.00 ⟶ | | increase |
| 0.65 | 0.60 | 0.60 | 0.60 | 0.65 | 0.70 | — | — | 1.25 | 1.25 |

Table 4

| | Fluoroelastomer | Magnesium oxide | Medium thermal carbon | Calcium hydroxide | Hydroquinone | 8-benzyl-1,8-diaza-bicyclo-[5.4.0]-7-undecenium chloride |
|---|---|---|---|---|---|---|
| Ex. 9 | 100 | 10 | 20 | 2 | 1 | 0.8 |
| Ex. 10 | 100 | 10 | 20 | 2 | 1 | 0.8 |
| Ex. 11 | 100 | 10 | 20 | 2 | 1 | 0.8 |

| Modulus at 100 % (kg./cm.$^2$) | Tensile strength (kg./cm.$^2$) | Properties Elongation (%) | Hardness | Compression set 30°C × 24hr (%) | 200°C × 24hr (%) |
|---|---|---|---|---|---|
| 91 | 162 | 160 | 80 | 10 | 21 |
| 88 | 159 | 170 | 79 | 11 | 23 |
| 85 | 164 | 150 | 81 | 14 | 23 |

What we claim is:

1. A fluoroelastomer composition comprising (a) a fluoroelastomer copolymer, (b) at least one member selected from the group consisting of bivalent metal oxide, bivalent metal hydroxide and mixture of bivalent metal oxide or metal hydroxide with metal salt of weak acid, (c) an aromatic polyhydroxy compound, and from about 0.2 to 10 parts per 100 parts by weight of fluoroelastomer copolymer of (d) a quaternary ammonium compound having the general formula:

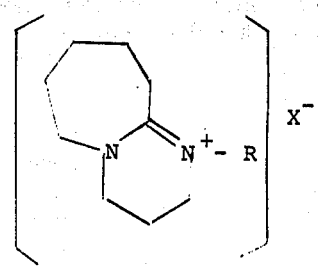

wherein R is alkyl group having 1 to 24 carbon atoms or aralkyl group having 7 to 20 carbon atoms, and X⁻ is an anion such as halide ion, hydroxylate ion, alkoxylate ion, carboxylate ion, phenoxide ion, sulfonate ion, sulfate ion, sulfite ion and carbonate ion.

2. The composition of claim 1, wherein said quaternary ammonium compound is present in an amount of 0.2 to 3 parts by weight to 100 parts by weight of fluoroelastomer.

3. The composition of claim 1, wherein said quaternary ammonium compound is a member selected from the group consisting of 8-methyl-1,8-diaza-bicyclo[5.4.0]-7-undecenium chloride, 8-methyl-1,8-diaza-bicyclo[5.4.0]-7-undecenium iodide, 8-methyl-1,8-diaza-bicyclo[5.4.0]-7-undecenium hydroxide, 9-methyl-1,8-diaza-bicyclo[5.4.0]-7-undecenium methylsulfate, 8-ethyl-1,8-diaza-bicyclo-[5.4.0]-7-undecenium bromide, 8-propyl-1,8-diaza-bicyclo-[5.4.0]-7-undecenium bromide, 8-dodecyl-1,8-diaza-bicyclo-[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0]-7-undecenium chloride, 8-benzyl-1,8-diaza-bicyclo[5.4.0]-7-undecenium chloride, 8-benzyl-1,8-diaza-bicyclo[5.4.0]-7-undecenium hydroxide, 8-phenethyl-1,8-diaza-bicyclo[5.4.0]-7-undecenium chloride and 8-(3-phenylpropyl)-1,8-diaza-bicyclo[5.4.0]-7-undecenium chloride.

4. The composition of claim 1, wherein said (b) ingredient is added in an amount of 2 to 30 parts by weight to 100 parts by weight of fluoroelastomer.

5. The composition of claim 1, wherein said (b) ingredient is added in an amount of 5 to 20 parts by weight to 100 parts by weight of fluoroelastomer.

6. The composition of claim 1, wherein said aromatic polyhydroxy compound is added in an amount of 0.5 to 5 parts by weight to 100 parts by weight of fluoroelastomer.

7. The composition of claim 1, wherein said aromatic polyhydroxy compound is added in an amount of 1 to 2 parts by weight to 100 parts by weight of fluoroelastomer.

8. The composition of claim 1, wherein said polyhydroxy aromatic compound is hydroquinone, 2,2-bis(4-hydroxyphenyl)propane, 2,2-bis(4-hydroxyphenyl)butane or 2,2-bis(4-hydroxyphenyl) per fluoro propane.

9. The composition of claim 1, wherein said fluoroelastomer is a copolymer of vinylidene fluoride and hexafluoropropene.

10. The composition of claim 9, wherein said fluoroelastomer is a copolymer which composition is in the ratio of vinylidene fluoride and hexafluoropropene being 92 : 8 to 66 : 34 by mole.

11. The composition of claim 1, wherein said fluoroelastomer is a terpolymer of vinylidene fluoride, tetrafluoroethylene and hexafluoropropene.

12. The composition of claim 11, wherein said fluoroelastomer is a terpolymer which composition is in rectangular area formed by the following four ratios of vinylidene fluoride, tetrafluoroethylene and hexafluoropropene being 85.7 : 5 : 9.3, 59.7 : 5 : 35.3, 28 : 30 : 42 and 54 : 30 : 16 by mole.

13. The composition of claim 1, wherein said fluoroelastomer copolymer is an elastomeric copolymer of vinylidene fluoride and at least one other fluoroolefin.

14. The composition of claim 1, wherein said fluoroelastomer copolymer is an elastomeric copolymer of vinylidene fluoride and at least one of the members selected from the group consisting of hexafluoropropene, pentafluoropropene, trifluoroethylene, trifluorochloroethylene, tetrafluoroethylene, vinyl fluoride, perfluoro(methyl vinyl ether) and perfluoro(propy vinyl ether).

15. A fluoro-rubber obtained by curing the fluoroelastomer composition of claim 1.

16. A process for preparing fluoro-rubber which comprises milling a fluoroelastomer composition comprising (a) a fluoroelastomer copolymer, (b) at least one member selected from the group consisting of bivalent metal oxide, bivalent metal hydroxide and mixture of bivalent metal oxide or metal hydroxide with metal salt of weak acid, (c) an aromatic polyhydroxy compound, and from about 0.2 to 10 parts per 100 parts by weight of fluoroelastomer copolymer of (d) quaternary ammonium compound having a general formula:

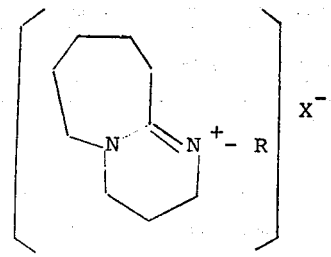

wherein R is alkyl group having 1 to 24 carbon atoms or aralkyl group having 7 to 20 carbon atoms, and X⁻ is an anion such as halide ion, hydroxylate ion, alkoxylate ion, carboxylate ion, phenoxide ion, sulfonate ion, sulfate ion, sulfite ion and carbonate ion, putting into a mold, curing at a temperature of 100° to 200°C. under a pressure of 20 to 100 kg./cm.² for a period of 10 to 180 minutes, removing out of the mold and curing at a temperature of 150° to 300°C. for a period of 0 to 30 hours in an oven.

17. A fluoro-rubber obtained by the process of claim 16.

* * * * *